United States Patent [19]

Kumagai

[11] Patent Number: 4,845,578
[45] Date of Patent: Jul. 4, 1989

[54] DISK HOLDING DEVICE FOR DISK DRIVE

[75] Inventor: Takeshi Kumagai, Kakuda, Japan

[73] Assignee: Alps Electric Co., Ltd., Japan

[21] Appl. No.: 111,553

[22] Filed: Oct. 20, 1987

[30] Foreign Application Priority Data

Feb. 18, 1987 [JP] Japan .............................. 62-23387[U]

[51] Int. Cl.[4] .......................................... G11B 5/012
[52] U.S. Cl. .................................. 360/97.01; 369/270
[58] Field of Search ..................... 360/97–99; 369/270–271; 403/1

[56] References Cited

U.S. PATENT DOCUMENTS

| | | | |
|---|---|---|---|
| 4,351,047 | 9/1982 | Redlich et al. | 369/270 |
| 4,358,843 | 11/1982 | Rager | 369/270 X |
| 4,466,031 | 8/1984 | Muraoka | 360/97 |
| 4,466,032 | 8/1984 | Saito | 360/99 |
| 4,490,635 | 12/1984 | Harrison et al. | 360/106 X |
| 4,618,900 | 10/1986 | Saito | 360/97 |
| 4,655,616 | 4/1987 | Duncan | 384/446 |
| 4,665,453 | 5/1987 | Mikamoto et al. | 360/97 |

FOREIGN PATENT DOCUMENTS 00-77683  5/1984  Japan ..................................... 360/97

*Primary Examiner*—John H. Wolff
*Assistant Examiner*—David J. Severin
*Attorney, Agent, or Firm*—Guy W. Shoup; Paul J. Winters; Norman R. Klivans

[57] ABSTRACT

A disk driving apparatus is disclosed which, in such apparatus constituted of a disk holding portion on which a hub disposed in the center of a disk is loaded and a motor for supplying the disk holding portion with rotational power, comprises a guide cap which is disposed within the disk holding portion and driven by the motor. The guide cap is provided thereon with a centering peripheral surface, over which the center hole of the hub is to be fitted with virtually no clearance left therebetween, and a taper surface formed in continuance from the centering peripheral surface for guiding the center hole of the hub onto the centering peripheral surface.

1 Claim, 3 Drawing Sheets

DISK HOLDING DEVICE FOR DISK DRIVE

BACKGROUND OF THE INVENTION

1. Field of the Invention

The present invention relates to a disk driving apparatus for positioning and rotatively driving a disk for an SVF system (STILL VIDEO FLOPPY SYSTEM) or the like.

2. Description of the Prior Art

FIG. 3 shows a disk cartridge 1 for an SVF system capable of recording and reproducing a still picture signal and a disk driving apparatus 10 for driving a disk within the cartridge 1. FIG. 4 shows in section a prior art disk driving apparatus 10 of the described type.

As shown in FIG. 4, in the cartridge 1 for a disk for the SVF system, there are made holes 2a and 2b in the center of a case 2, and between the holes 2a and 2b is provided a hub 3. The disk D received in the case 2 is fixed at its center to the hub 3, and on the underside of the periphery of this hub 3, there is provided a yoke 4 of a magnetic material for attraction by a magnet.

On the other hand, the disk driving apparatus 10 is formed of a disk holding portion 11 and a motor 12 as shown in FIG. 4. In this apparatus, a pair of ball bearings 15 are fixed at their inner rings to a shaft 14 which is fixed to a chassis 13, and to the outer rings of the ball bearings 15 is fixed a bearing housing 16. In this prior art example, the upper peripheral surface of the bearing housing 16 is made into a centering peripheral surface 16a. The centering peripheral surface 16a is dimensioned so as to fit in the center hole 3a of the hub 3 within the disk cartridge 1 with virtually no clearance left therebetween. In the SVF system, since the data track recorded on the disk D must be scanned by a magnetic head with high accuracy, the centering peripheral surface 16a is required to be controlled within the order of a μm in its rotational run-out tolerance and fit tolerance with the hub 3. At the upper end of the shaft 14, there is fixedly disposed a guide member 17. The underside of the guide member 17 is in abutment with the inner ring of the upper ball bearing 15, and the inner and outer rings of the upper and lower ball bearings 15 are provided with a pre-load in the direction of thrust by the guide member 17. Further, the peripheral surface of the guide member 17 is made into a taper surface 17a, and the center hole 3a of the hub 3 within the disk cartridge 1 is adapted to be guided by the taper surface 17a onto the above mentioned centering peripheral surface 16a. And, on the upper periphery of the bearing housing 16, there is disposed a center core 18, and on the interior of the upper portion of the center core 18 is disposed a hold magnet 19.

The yoke 4 formed integral with the hub 3 within the cartridge 1 is attracted by the hold magnet 19 so that the under side of the yoke 4 is brought into abutment with the upper side 18a of the center core 18. And, the center hole 3a of the hub 3 guided by the taper surface 17a is put on the centering peripheral surface 16a. Under such conditions, the disk D within the disk cartridge 1 is accurately positioned and held by the disk holding portion 11.

While there is provided a rotor magnet 22 fixed to a rotor 21 which is fixedly attached to the lower periphery of the bearing housing 16, there is provided a rotor yoke 25 fixed to the bearing housing 16 opposite to the rotor magnet 22. On the chassis 13, there is provided a base plate 23, and on this base plate 23 is mounted a stator coil 24 interposed between the rotor magnet 22 and the rotor yoke 25. In the motor 12, the rotor magnet 22 is rotatively driven by the current passed through the stator coil 24. And thereby, the hub 3 held at the upper portion of the bearing housing 16 is driven for rotation within the case 2 of the cartridge.

The case 2 of the cartridge as shown in FIG. 3 is provided with a shutter 5, and the disk D when the shutter 5 is open is exposed to outside so that the magnetic head (not shown) is enabled to make record or reproduction on the same.

When a disk cartridge 1 is loaded on the disk driving apparatus as shown in FIG. 4, the center hole 3a of the hub 3 is guided by the taper surface 17a of the guide member 17 to be engaged with the centering peripheral surface 16a. By convention, however, the centering peripheral surface 16a is formed on the periphery of the bearing housing 16, whereas the taper surface 17a is formed on the separate member therefrom, or the guide member 17 for preloading the bearings. When in such way the taper surface 17a and the centering peripheral surface 16a are formed on separate members, there is produced some stepped portion at the junction (portion A) between both the members, so that, at the time of loading the apparatus with a disk cartridge 1, it sometimes occurs that the center hole 3a of the hub 3 catches in the portion A, whereby the operation for positioning the hub 3 is not smoothly performed.

SUMMARY OF THE INVENTION

The present invention was made to solve the above mentioned problem in the prior art, and a primary object of the present invention is to provide a disk driving apparatus in which the hub in the center of a disk when loaded on the disk holding portion will be smoothly engaged with the centering peripheral surface without catching in any portion in the way.

To achieve the aforementioned object, the present invention, in a disk driving apparatus constituted of a disk holding portion on which the hub disposed in the center of a disk is loaded and a motor for providing the disk holding portion with rotational power, is characterized in that it comprises a guide cap disposed within the disk holding portion and driven by the motor, the guide cap being provided thereon with a centering peripheral surface, over which the center hole of the hub is fitted with virtually no clearance left therebetween, and a taper surface formed in continuance therefrom for guiding the center hole of the hub into the centering peripheral surface.

According to the disk driving apparatus of the present invention, the center hole of the hub disposed in the center of the disk is guided by the taper surface formed on the guide cap so as to be engaged with the centering peripheral surface continuously formed on the same guide cap. Since the taper surface and the centering peripheral surface are formed on the same guide cap, such trouble can be eliminated as that the hub catches in some portion in the course it is loaded.

DESCRIPTION OF THE PREFERRED EMBODIMENT

An embodiment of the present invention will be described below with reference to the accompanying drawings.

Figure 1:
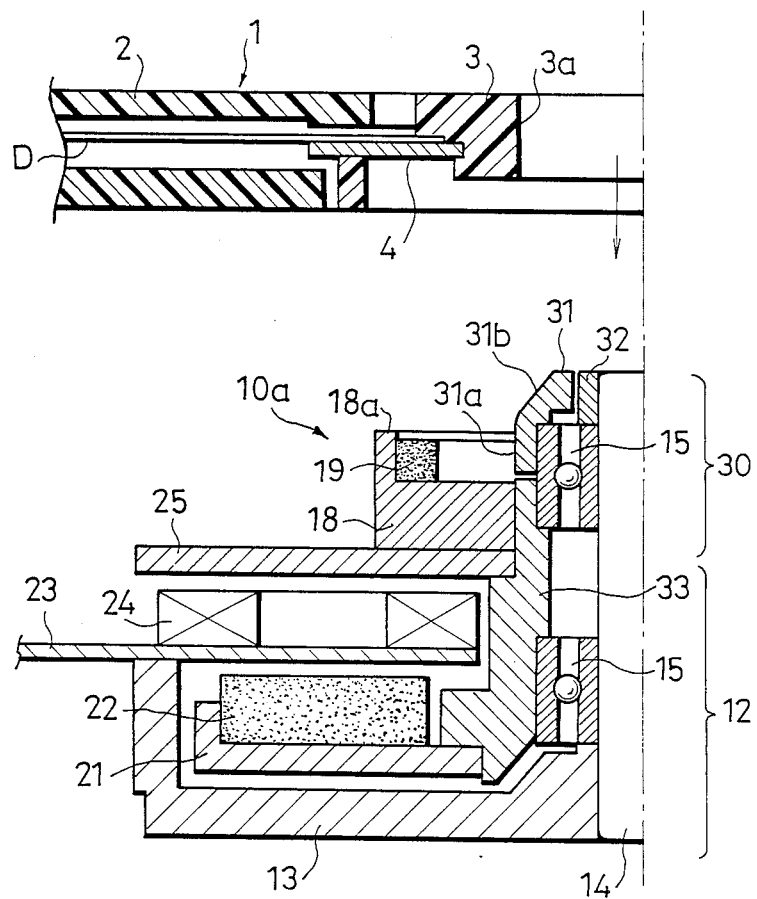
FIG. 1 is a partial enlarged sectional view of a disk driving apparatus according to the present invention and a cartridge.
Figure 2:
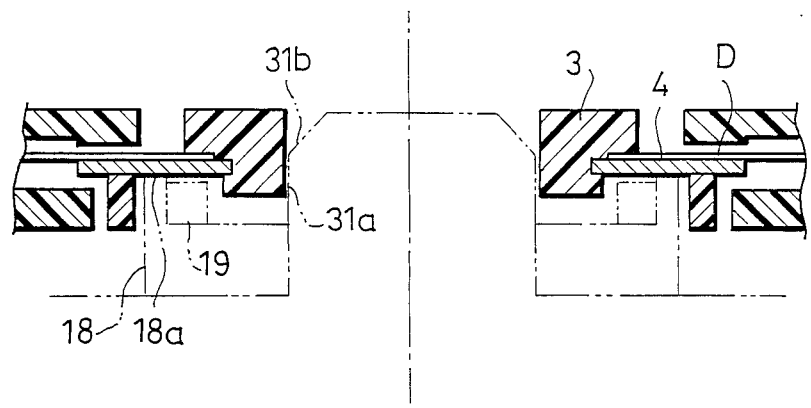
FIG. 2 is an enlarged sectional view of a cartridge loaded on a disk driving apparatus.

FIG. 1 is an enlarged sectional view of a cartridge and a disk driving apparatus and FIG. 2 is a sectional view of a disk driving apparatus loaded with a cartridge.

Figure 3:
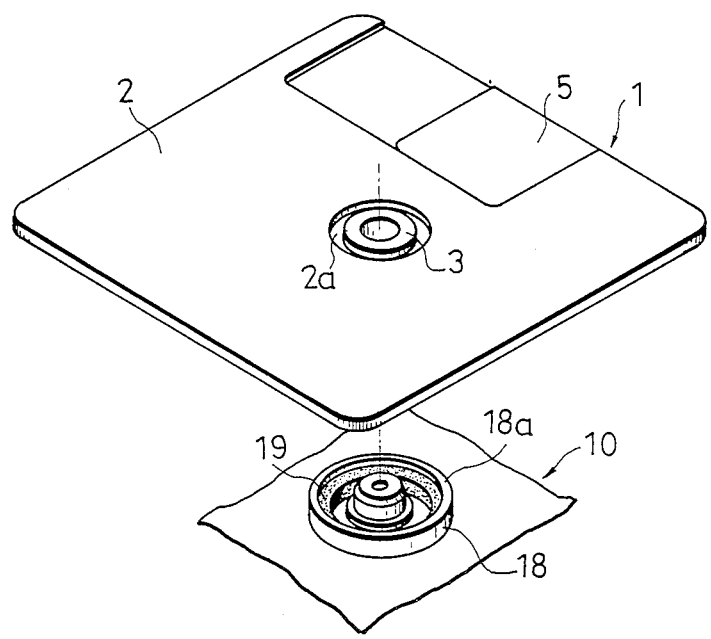
FIG. 3 is a perspective view of a cartridge and a disk driving apparatus.
Figure 4:
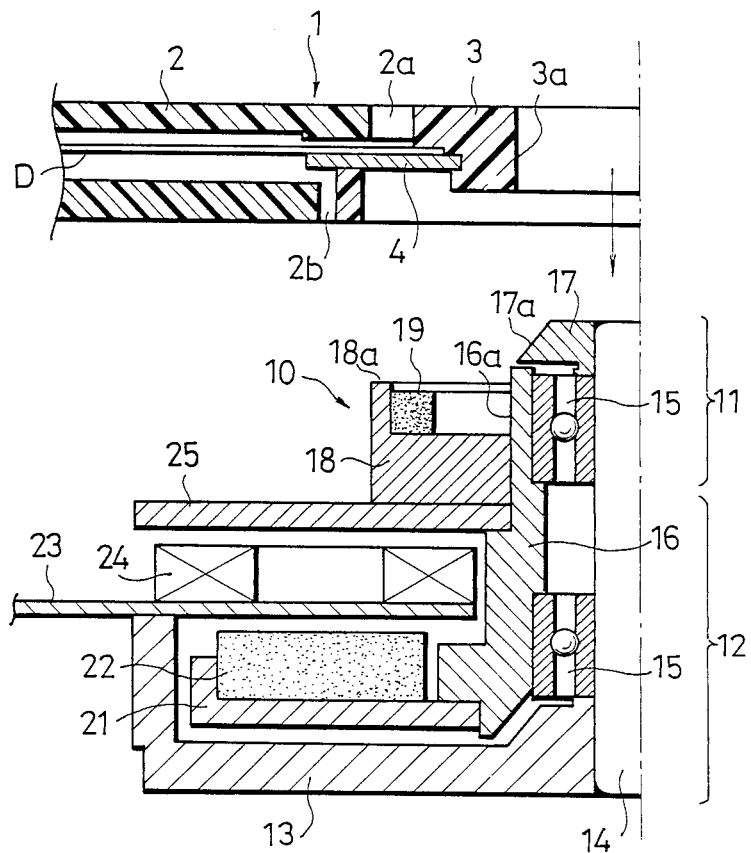
FIG. 4 is a partial enlarged sectional view of a disk driving apparatus of the prior art and a cartridge.

The disk cartridge 1 shown in FIG. 1 is that for the SVF apparatus the same as that shown in FIGS. 3 and 4. The internal structure consists as described above of a hub 3 disposed within a case 1 for rotation, a disk fixed to the periphery of the hub 3, and a yoke 4 for attraction by a magnet.

On the other hand, the disk driving apparatus 10a according to the present invention consists of a disk holding portion 30 and a motor 12. While the motor 12 is of the same structure as the conventional one as shown in FIG. 4, the disk holding portion 30 is different from the disk holding portion 11 as shown in FIG. 4.

There are provided ball bearings 15 at the upper portion and lower portion of the shaft 14 which is fixed to the chassis 13, and to the outer rings of the ball bearings 15 is fixed a bearing housing 33. The bearing housing 33 is made shorter than the conventional one at its upper end portion, such that only the lower half of the outer ring of the upper ball bearing 15 is put in the bearing housing 33. Further, a guide cap 31 is put on the upper half of the outer ring of the upper ball bearing 15. The peripheral surface of the guide cap 31 is made into a centering peripheral surface 31a, and toward the upper end of the guide cap 31, there is formed a taper surface 31b in continuance from the centering peripheral surface 31a. Here, the guide cap 31 is disposed in place with reference to the peripheral surface of the outer ring of the upper bearing 15. The peripheral surface of a ball bearing 15 in general is fabricated with high precision such that its rotational run-out from the axis and other errors are minimized, and therefore, the guide cap 31 can be precisely positioned with reference to the axis of the shaft 14. Further, the centering peripheral surface 31a is fabricated, since it is to be fitted into the center hole 3a of the hub 3 in the center of the disk D, such that its rotational run-out and other errors may be minimized and the diametric size of the centering peripheral surface 31a is finished with high precision. At the upper end portion of the shaft 14, there is fixed a pre-load ring 32 with its under side pressed against the inner ring of the ball bearing 15. The pre-load ring 32 is provided separate from the guide cap 31. By the pre-load ring 32, the inner and outer rings of the upper and lower ball bearings 15 are given a pre-load in the direction of thrust.

Like in the conventional one, there are provided a center core 18 attached to the upper portion of the bearing housing 33 and a hold magnet 19 disposed on the interior of the upper portion of the center core 18.

The motor 12 is the same as conventional one, that is, there are provided a rotor magnet 22 supported on a rotor 21 and a rotor yoke 25 opposite thereto attached to the bearing housing 33 as well as a stator coil 24 mounted on a base plate 23 disposed on the chassis 13.

The operation for loading a cartridge on the disk driving apparatus will be described below.

When the disk cartridge 1 is to be loaded on the disk driving apparatus 10a as shown in FIG. 3, first, the center hole 3a of the hub 3 is guided by the taper surface 31b of the guide cap 31 and the center hole 3a is engaged with the centering peripheral surface 31a on the periphery of the guide cap 31. And, the yoke 4 provided in the hub 3 is attracted by the hold magnet 19 whereby the yoke 4 is brought into abutment with the upper side 18a of the center core 18. Under these conditions, the disk D and the hub 3 are positioned and held by the disk holding portion (refer to FIG. 2).

And the hub 3 and the disk D are rotatively driven by the power of the motor 12.

According to the present invention as described above, the taper surface and the centering peripheral surface are formed on the comon guide cap, so that the center hole of the hub disposed within the disk is positively and smoothly engaged with the centering peripheral surface without catching any portion in the way.

What is claimed is:

1. A disk holding device for a disk driving apparatus having a disk holding portion to which a hub arranged at a central part of a disk is fitted, and a motor for applying a rotational force to the disk holding portion, wherein the improvement comprises:

that said disk holding portion is provided with a guide cap at an outer ring of a bearing fitted to a shaft vertically mounted on a chassis of the motor, and the guide cap is continuously formed with a centering peripheral surface to which a center hole of the hub is fitted with scarce clearance therebetween and a tapered surface for guiding the center hole of the hub toward the centering peripheral surface.

* * * * *